United States Patent
Nes

(10) Patent No.: US 10,451,028 B2
(45) Date of Patent: Oct. 22, 2019

(54) WIND POWER PLANT

(71) Applicant: Quick Response AS, Veitastrond (NO)

(72) Inventor: Nils Asbjørn Nes, Veitastrond (NO)

(73) Assignee: QUICK RESPONSE AS, Veitastrond (NO)

(*) Notice: Subject to any disclaimer, the term of this patent is extended or adjusted under 35 U.S.C. 154(b) by 22 days.

(21) Appl. No.: 15/546,969

(22) PCT Filed: Dec. 22, 2015

(86) PCT No.: PCT/NO2015/050258
§ 371 (c)(1),
(2) Date: Jul. 27, 2017

(87) PCT Pub. No.: WO2016/122327
PCT Pub. Date: Aug. 4, 2016

(65) Prior Publication Data
US 2018/0023542 A1    Jan. 25, 2018

(30) Foreign Application Priority Data

Jan. 28, 2015   (NO) .................................... 20150133

(51) Int. Cl.
*F03D 1/02* (2006.01)
*F03D 13/25* (2016.01)
(Continued)

(52) U.S. Cl.
CPC .............. *F03D 1/02* (2013.01); *B63B 21/507* (2013.01); *B63B 35/44* (2013.01); *F03D 9/25* (2016.05);
(Continued)

(58) Field of Classification Search
CPC ... F03D 1/02; F03D 9/25; F03D 80/50; F03D 13/10; F03D 13/25; B63B 35/44;
(Continued)

(56) References Cited

U.S. PATENT DOCUMENTS 6,294,844 B1 * 9/2001 Lagerwey ............... F03D 13/25
290/44
2003/0137149 A1   7/2003 Northrup et al.
(Continued)

FOREIGN PATENT DOCUMENTS

CN          102282361 A    12/2011
GB            2461772 A     1/2010
(Continued)

OTHER PUBLICATIONS

Chinese Office Action dated Nov. 8, 2018 issued in Chinese Application No. 201580074758.2.
(Continued)

*Primary Examiner* — Joseph J Dallo
*Assistant Examiner* — Scott A Reinbold
(74) *Attorney, Agent, or Firm* — Arent Fox LLP

(57) ABSTRACT

A wind power plant comprises a platform having a deck and a frame. The frame comprises a plurality of generator stations, each configured for receiving and supporting a respective removable wind turbine generator. Generator conveyance means are configured and arranged for moving a wind turbine generator between the deck and a generator station. The wind turbine generator comprises a housing in which a turbine is rotatably arranged. The turbine comprising a plurality of blades interconnected by a peripheral rim; and the rim comprises a plurality of magnets. The housing comprises a plurality of coils arranged in close proximity to the peripheral rim. The platform may be a floating platform, supported by at least a main hull, connectable to a seabed via turret mooring, whereby the power plant is allowed to weathervane.

9 Claims, 9 Drawing Sheets

(51) Int. Cl.
    *F03D 13/10*         (2016.01)
    *F03D 80/50*         (2016.01)
    *F03D 9/25*           (2016.01)
    *B63B 21/50*         (2006.01)
    *B63B 35/44*         (2006.01)

(52) U.S. Cl.
    CPC .............. *F03D 13/10* (2016.05); *F03D 13/25* (2016.05); *F03D 80/50* (2016.05); *B63B 2035/446* (2013.01); *F05B 2220/7068* (2013.01); *F05B 2240/33* (2013.01); *F05B 2240/40* (2013.01); *F05B 2240/916* (2013.01); *F05B 2240/931* (2013.01); *Y02E 10/725* (2013.01); *Y02E 10/727* (2013.01); *Y02E 10/728* (2013.01)

(58) Field of Classification Search
    CPC ............. B63B 21/507; B63B 2035/446; Y02E 10/727; Y02E 10/728; Y02E 10/725; F05B 2240/931; F05B 2240/916; F05B 2240/40; F05B 2240/33; F05B 2220/7068; E02B 17/0034
    USPC ......................................................... 426/120
    See application file for complete search history.

(56) References Cited

U.S. PATENT DOCUMENTS

2013/0334824 A1* 12/2013 Freda ...................... F03D 80/70
                                                            290/55
2015/0240512 A1* 8/2015 Homsi .................. E04H 12/345
                                                            52/745.18

FOREIGN PATENT DOCUMENTS

| | | |
|---|---|---|
| NO | 328222 B1 | 1/2010 |
| RU | 2008512 C1 | 2/1994 |
| RU | 2009372 C1 | 3/1994 |
| RU | 76399 U1 | 9/2008 |
| RU | 2432491 C2 | 10/2011 |
| RU | 2487264 C2 | 7/2013 |
| SU | 1063702 A1 | 12/1983 |
| SU | 1280180 A1 | 12/1986 |
| UA | 73027 C2 | 5/2005 |
| UA | 41461 U | 5/2009 |
| WO | WO 98/32968 A1 | 7/1998 |
| WO | WO 99/02856 A1 | 1/1999 |
| WO | WO 2010-019050 A1 | 2/2010 |
| WO | WO 2013/185057 A1 | 12/2013 |
| WO | WO 2014/112115 A1 | 7/2014 |

OTHER PUBLICATIONS

International Preliminary Report on Patentability issued in PCT/NO2015/050258 dated May 15, 2017.
International Search Report and Written Opinion issued in PCT/NO2015/050258 dated Apr. 20, 2016.
Norwegian Search Report issued in Norwegian Patent Application No. 20150133 dated Aug. 27, 2015.
Office Action issued in Norwegian Patent Application No. 20150133 dated Aug. 27, 2015.
Apr. 8, 2019 Search Report issued in Russian Patent Application No. 2017130329.

* cited by examiner

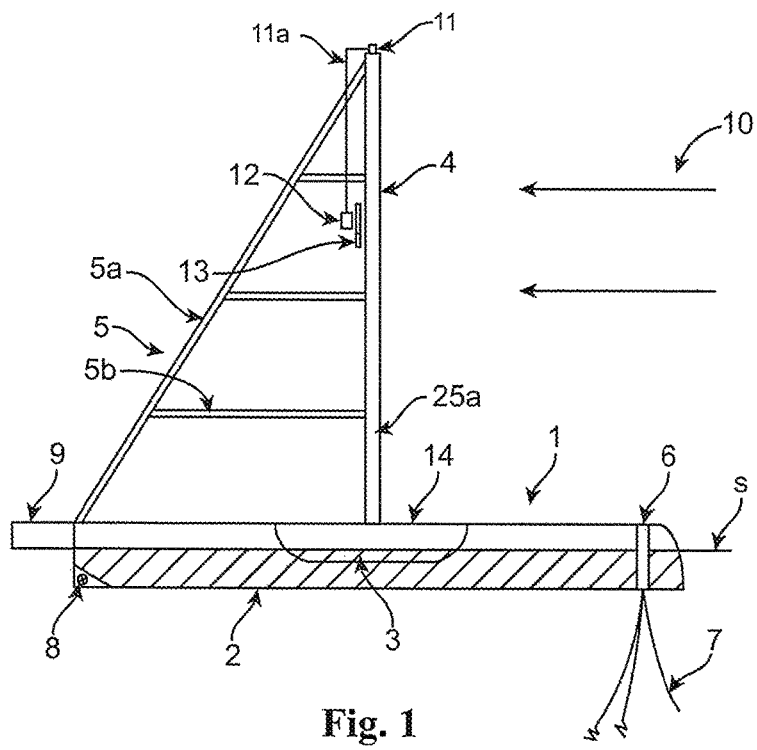
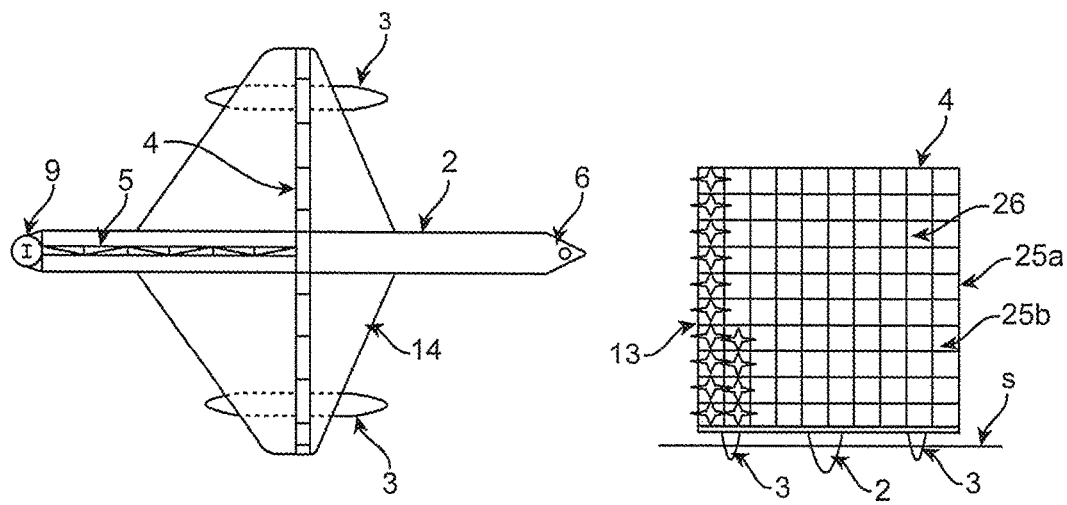
Fig. 1
Fig. 2
Fig. 3

WIND POWER PLANT

CROSS-REFERENCE TO RELATED APPLICATIONS

This application is a National Stage entry of International Application No.: PCT/NO2015/050258, filed Dec. 22, 2015, which claims priority to Norwegian Patent Application No. 20150133, filed Jan. 28, 2015. The disclosure of the priority applications are hereby incorporated in their entirety by reference.

FIELD OF THE INVENTION

The invention concerns wind-powered plants for generation of electrical energy, as set out by the preamble of claim 1.

BACKGROUND OF THE INVENTION

Wind power technology has seen a substantial development over the recent years, especially that concerning three-bladed wind turbines. The largest state-of-the-art wind turbines have rotor diameters on the of 150 meters and generate approximately 6 MW of installed power. A problem with these large turbines is vibrations, due to i.a. supersonic tip speeds.

According to Betz' law, the maximum efficiency of a conventional wind turbine is 59.3%. In practice, the efficiency of today's wind power plants range between 35% and 40%. Several wind power plants are installed on the seabed in shallow waters, and floating plants are developed for use farther off shore. Conventional wind turbines generate considerable noise and pose severe threats to avian life.

Various types of floating wind power plants exist. The prior art includes WO 2014/112115 A1, which describes a floating wind-power generation plant, where a wind-power generator is installed on top of a floating body moored at a mooring position by a mooring line and electric power generated by the wind-power generator is supplied to a cable. The prior art also included WO 2010/019050 A1, which describes a foundation for an offshore wind turbine generator. The foundation is a self-floating and stable construction of reinforced concrete, comprising a foundation structure, a hollow, substantially conical tower structure arranged on the foundation structure and having a lower external diameter less than the smallest transversal dimension of the foundation structure, since the diameter of the tower structure gradually decreases upwards toward the upper portion of the tower structure. The prior art also includes WO 99/02856 A1, which describes an installation comprising windmills mounted in a frame. The frame is provided with float bodies, and it is capable of rotation about a vertical axis in order to turn the windmills towards the wind. In order to keep the windmills upright, supporting means, for example a body which is anchored to the bottom, are disposed some distance away from the plane of the windmills.

Prior art wind power plants, with conventional, pylon-mounted generators, have limited performance characteristics in high winds; they are maintenance intensive and must be closed down completely when repairs or refurbishments become necessary. It is therefore a need for a wind power plant which is easier to operate and maintain, and can handle high wind loads.

The prior art also includes GB 2461772 A, describing a floating wind power generation apparatus comprising a floating platform, a frame and plurality of wind power generators arranged in the frame. The wind power generators are individually mounted to the frame via upper and lower trunnion shafts to allow the individual generators to align with the wind. During assembly, the wind power generators are first mounted on the frame, before the frame is installed on the floating platform, or vice versa. A generator unit is connected to each wind-wheel. The position of the floating platform is fixed by means of an anchor.

The invention is an improvement of the prior art and offers in addition other advantages.

SUMMARY OF THE INVENTION

The invention is set forth and characterized in the main claim, while the dependent claims describe other characteristics of the invention.

It is thus provided a wind power plant, comprising a platform having a deck and configured for supporting a frame, characterized in that:
 the frame comprises a plurality of generator stations, configured for receiving and supporting a respective removable wind turbine generator; and by
 generator conveyance means configured and arranged for moving a wind turbine generator between the deck and a generator station.

In one embodiment, the generator conveyance means comprises a generator conveyer vehicle which is releasably connectable to generator transportation means on the frame, and the generator conveyer vehicle is configured and arranged to hold, support and manipulate a wind turbine generator. The power plant may comprise a carriage arranged for movement on the deck and for supporting the generator conveyer vehicle.

In one embodiment, the wind turbine generator comprises a housing in which a turbine is rotatably arranged; said turbine comprising a plurality of blades interconnected by a peripheral rim; said rim comprising a plurality of magnets, and the housing comprises a plurality of coils arranged in close proximity to the peripheral rim. The magnets may be electromagnets in which the magnetic force is adjustable. The magnets may be permanent magnets. The coils may be movable coils that are movable to adjust the distance between the coil and the rim. The generator housing, rim and blades are made of a non-magnetic material. In one embodiment, the housing, rim and blades are made of aluminium, for example extruded aluminium profiles.

In one embodiment, the platform is a floating platform, supported by at least a main hull, connectable to a seabed via turret mooring, whereby the power plant is allowed to weathervane. The power plant may comprise a storage area for wind turbine generators.

The invented power plant is able to operate, and thus produce electricity, continuously, and does not need to close down due to maintenance or strong winds.

The invention allows for a more or less continuous operation, as the plant as such may remain in operation while one or more wind turbine generators are removed for repair or replacement. A number of spare generators may always be available on the platform, ensuring uninterrupted operation.

BRIEF DESCRIPTION OF THE DRAWINGS

These and other characteristics of the invention will become clear from the following description of preferential forms of embodiment, given as non-restrictive examples, with reference to the attached schematic drawings, wherein:

FIG. 1 is a side view of an embodiment of the invented power plant;

FIG. 2 is a plan view of the power plant shown in FIG. 1;

FIG. 3 is a front view of the power plant shown in FIG. 1;

DETAILED DESCRIPTION OF PREFERENTIAL EMBODIMENTS

Figure 4:
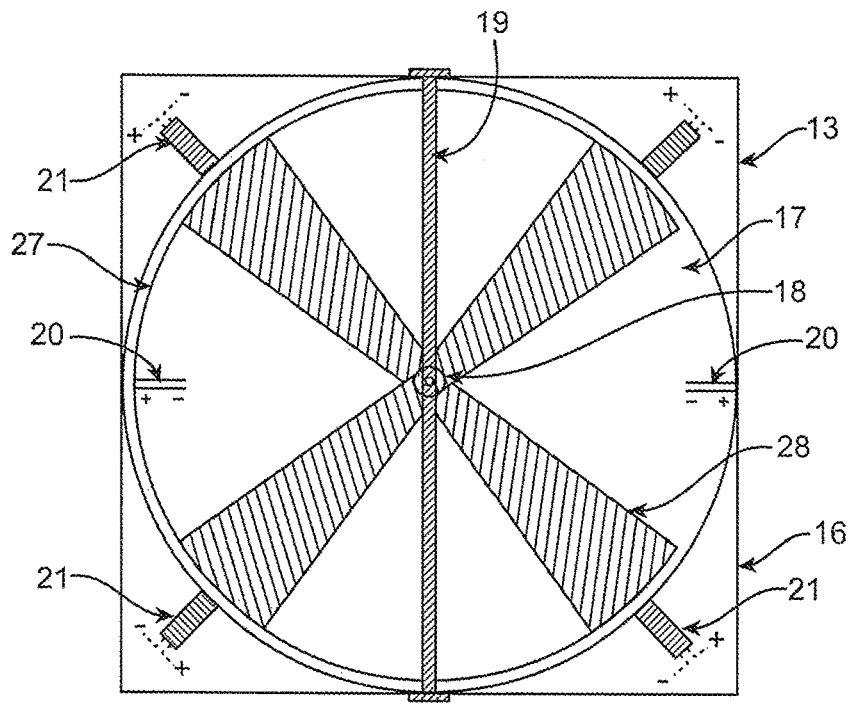
FIG. 4 is a front view of a first embodiment of a wind turbine generator, having electromagnets.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Referring initially to FIG. 1, the wind power plant comprises a platform 1 configured for floating on the sea S and comprising one or more hulls. In the illustrated embodiment, the platform comprises a main hull 2 and one outrigger 3 on each side of the main hull, in a trimaran configuration which per se is known. The trimaran platform is advantageously constructed from one large main barge and two smaller barges, one on each side of the large barge. The main hull is furnished with a stern (i.e. aft) side thruster 8. The three hulls (e.g. barges) are preferably connected by a deck structure 14 (see FIG. 2) having a certain width and height above sea level S. The deck height above sea level should preferably be of a magnitude so as to avoid wave forces on the deck.

Mooring lines 7 (or similar; e.g. fibre rope and/or chains) extend from a swivel connection 6 at the bow (i.e. forward) end of the main hull to one or more seabed anchors (not shown) of a type which per se is known in the art. The platform is thus 360° rotatable about the swivel and may weathervane with the wind and currents.

A frame 4 (hereinafter also referred to as a "sail") is erected on the platform, transversely to the hulls' longitudinal axes, and extends a vertical distance upwards. The sail 4 is typically welded to the hulls and the deck and is supported by a brace 5 comprising an inclined member 5a (connected to the main hull 2 aft portion) and a plurality of horizontal members 5b. The sail 4 comprises a lattice structure, with a plurality vertical columns 25a and horizontal columns 25b, forming a plurality of compartments 26 (see FIG. 3), each configured for receiving individual wind turbine generators 13. These compartments are therefore in the following referred to as generator stations 26. FIG. 3 shows only a few wind turbine generators 13 installed in respective compartments 26.

The brace 5 may contribute to a weathervaning effect, such that the platform always has a favourable orientation to the prevailing winds 10. The stem-mounted side thruster 8 (electrical, hydraulic, or engine powered) may be used is necessary.

The platform is furnished with facilities (not shown) enabling easy access for service boats, and a helipad 9 at the stem part of the main hull. Personnel shelters, service building and living quarters (not shown), may also be installed as need be.

FIG. 4 illustrates one embodiment of a wind turbine generator 13, configured for installation in a generator station 26 (see FIG. 3). The generator 13 comprises a housing 16, having an outer shape which is compatible with the shape of the generator station 26. In the illustrated embodiment, these shapes are squared, but the invention shall not be limited to such shapes.

A turbine 17 is rotatably mounted, via a boss 18, to a support beam 19, which in turn is rigidly supported by the housing 16. The turbine 17 comprises a plurality of turbine blades 28 (four shown in FIG. 4) interconnected by a peripheral rim 27. A number of electromagnets 20 (only two shown in FIG. 4) are connected to the rim 27 inward side. The skilled person will understand that more than two magnets may be required. The magnets 20 are preferably electromagnets, whereby the magnetic force may be adjusted.

A number of electric coils 21 are arranged in the housing 16 (in FIG. 4, tour coils, one in each corner of the housing), facing, and close to, the turbine rim 27.

In operation, when wind is making the turbine 17 rotate, the electromagnets 20 (rotating with the rim 27) will interact with the coils 21 and generate an electric current in the coils 21 by magnetic induction, in a manner that per se is well known in the art. The skilled person will understand that, depending on the polarity of the magnets, either alternating current (AC) or direct current (DC) may be generated. In a practical application, the plant may generate DC power, which is transformed into high voltage before being sent to shore via subsea cables (not shown).

Using electromagnets, one will be able to regulate the resistance of the rotating turbine and hence and how much electrical energy is produced. But regulating the magnetic resistance of the electromagnets will also directly regulate how much of the wind's kinetic energy is converted into electrical energy and how much of the wind's kinetic energy will pass unobstructed past the wind turbine generators and thus past the sail. This in turn will directly affect the plant's mooring system.

Figure 5:
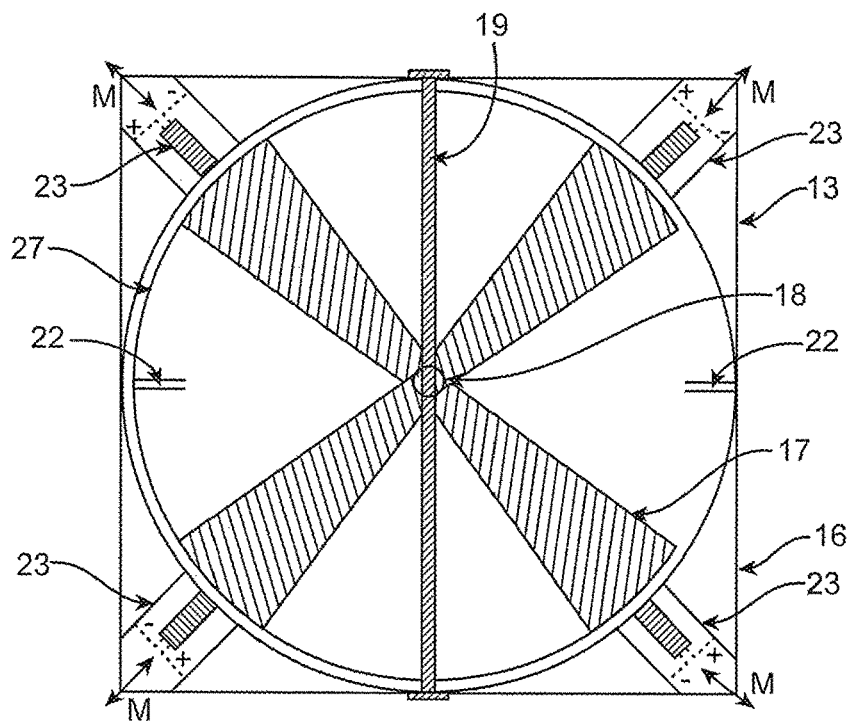
FIG. 5 is a front view of a second embodiment of a wind turbine generator, having permanent magnets.

FIG. 5 illustrates a second embodiment of the wind turbine generator 13, having a number of permanent magnets 22 (instead of the electromagnets 20 described above with reference to FIG. 4). The permanent magnets 22 (only two shown in FIG. 5) are connected to the rim 27 inward side. The skilled person will understand that more than two magnets may be required. In this embodiment, movable electric coils 23 are arranged in the housing 16 (in FIG. 5, four coils, one in each corner of the housing), facing, and close to, the turbine rim 27. The movable coils 23 may be moved back and forth, as indicated by the arrows M in FIG. 5, thus adjusting the distance between to the permanent magnets 22, and thus achieving the same effect as with electromagnets.

Returning to FIG. 3, showing a plurality of wind turbine generators 13 installed in respective generator stations 26, it will be appreciated that the invention allows for a continuous operation and generation of electricity. If one generator 13 required repair, refurbishment or must be replaced, the generator 13 in question may be removed (and re-installed) while the remaining generators are in operation. This modular configuration makes the invented power plant very versatile, robust and reliable.

FIG. 1 illustrates one such me hod of removal and replacement: A winch 11 is arranged at the top of the sail 4, and is connected via a wire 11a to a work platform 12. The work platform comprises room for one or more operators and connection means (not shown) whereby the generator 13 may be attached to the work platform 12 and lowered to (or hoisted from) the deck 14.

The invented power plant may be built very large. For example, the sail 4 may have a surface area of 200×200 meters (i.e. 40 000 m$^2$) or more. The invention shall, however, not be limited to such dimensions. The invented power plant is operational and capable of producing electrical energy under all conceivable weather conditions. Power generation in prior art wind power plants generally peaks at wind speeds of 11-12 m/s and ceases when the wind speed exceeds 20 m/s. With the invented power plant, however, having a sail surface area described above, may according to the inventor's calculations maintain full production and fully utilizing the wind energy out up to a wind speed of 20 m/s, then level off and generate a constant production at even higher wind speeds. Calculations shown that the invented power plant (with a 40 000 m$^2$ sail surface) may generate approximately 100 MW at a wind speed of 20 m/s.

Figure 6:
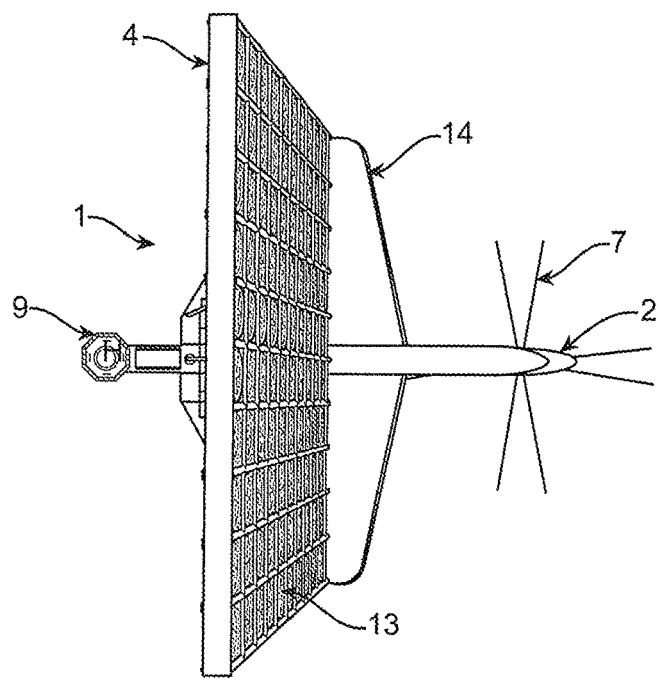
FIG. 6 is a perspective view from above of a second embodiment of the invented power plant.
Figure 7:
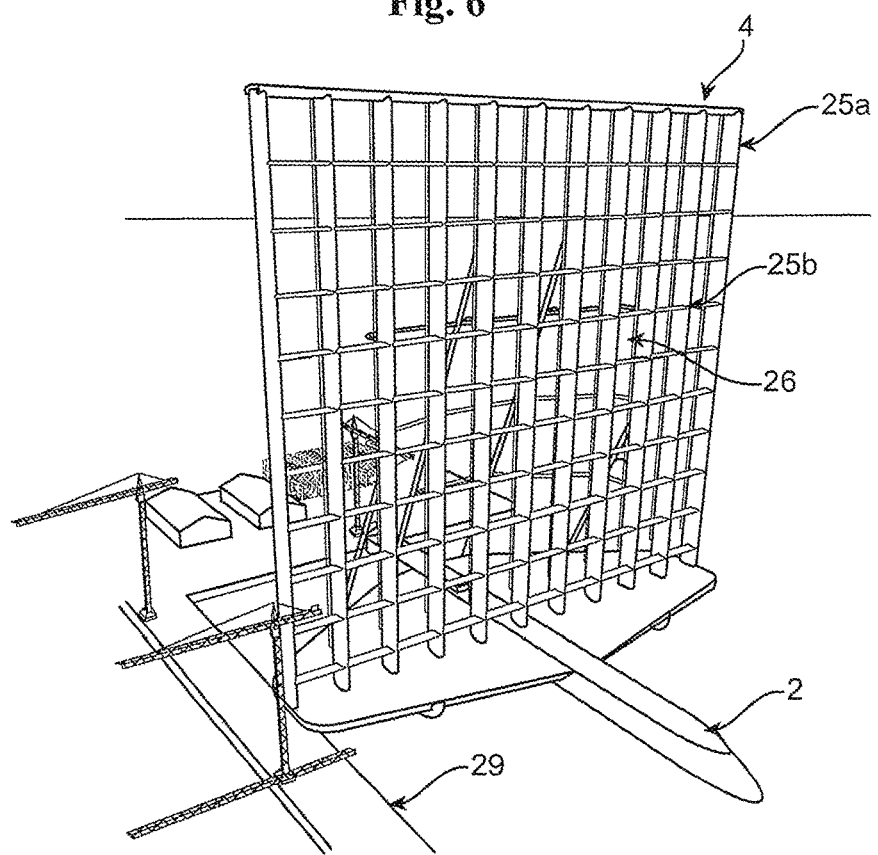
FIG. 7 is a perspective view of the power plant shown in FIG. 6, during assembly at a quayside locations, and before any wind turbine generators have been installed.
Figure 8:
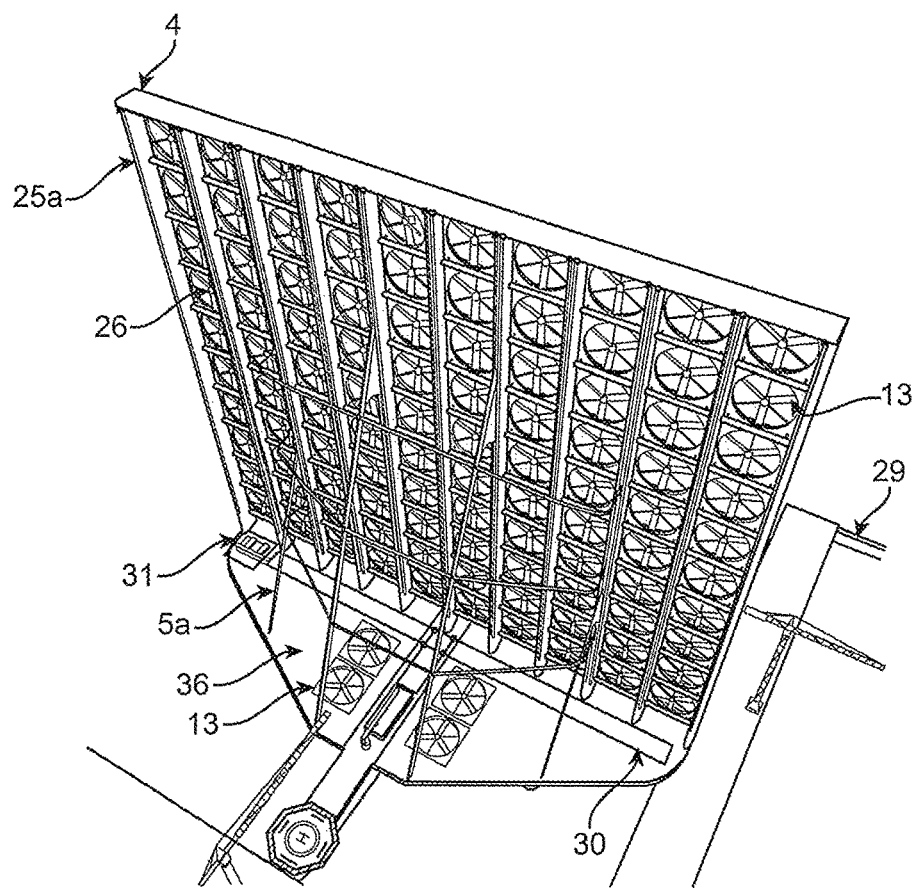
FIG. 8 is another perspective view of the power plant shown in FIG. 7, also showing a plurality of wind turbine generators stored on deck.

FIG. 6 illustrates a second embodiment of the invented power plant 1, comprising a main hull 2 and outrigger hulls (not shown) supporting a deck 14 and a sail 4 holding a plurality of wind turbine generators 13. In FIG. 7 and FIG. 8, the power plan is being assembled at a quay 29. As in the first embodiment, the sail 4 comprises a plurality of generator stations 26, generally defined by horizontal and vertical beams 26a,b. The deck 14 comprises a generator storage area 36, a crane (optional, not shown) and rail tracks 30 running between the generator storage area and to (alongside) the sail 4. FIG. 8 shows a number of wind turbine generators 13 stored in the storage area 36, and a carriage 31 placed on the rails 30.

Figure 9:
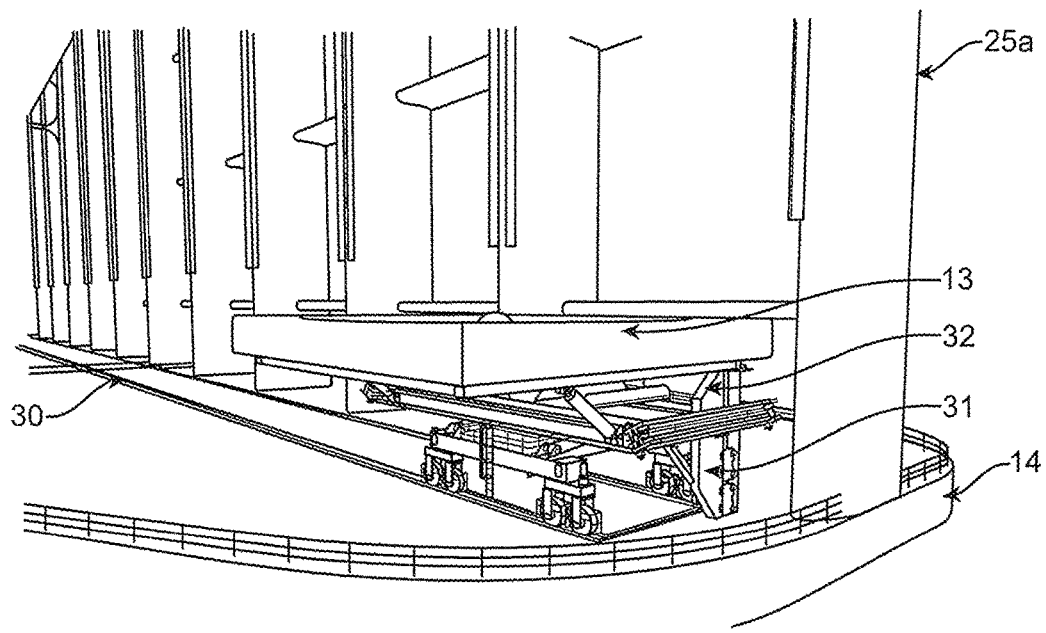
FIG. 9 is a perspective view of a step in the wind turbine generator installation process in the power plant shown in FIG. 8, showing a wind generator carried by a carriage and a generator conveyor vehicle.
Figure 10:
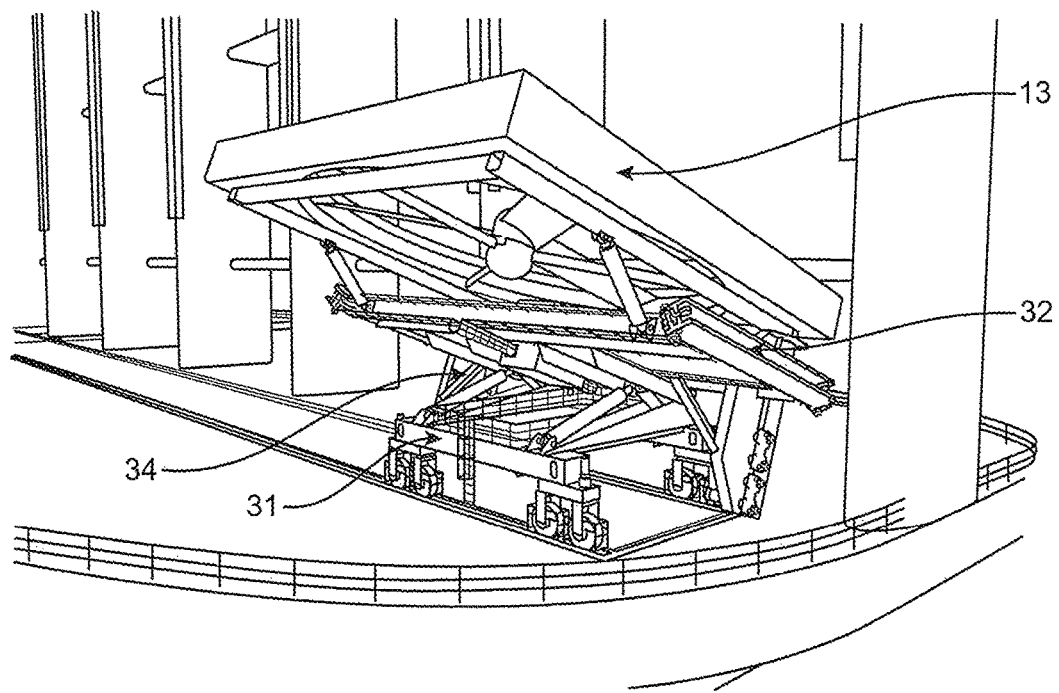
FIG. 10 shows a subsequent step to that of FIG. 9, in which a tilting assembly is in the process of raising the wind turbine generator from a horizontal orientation.
Figure 11:
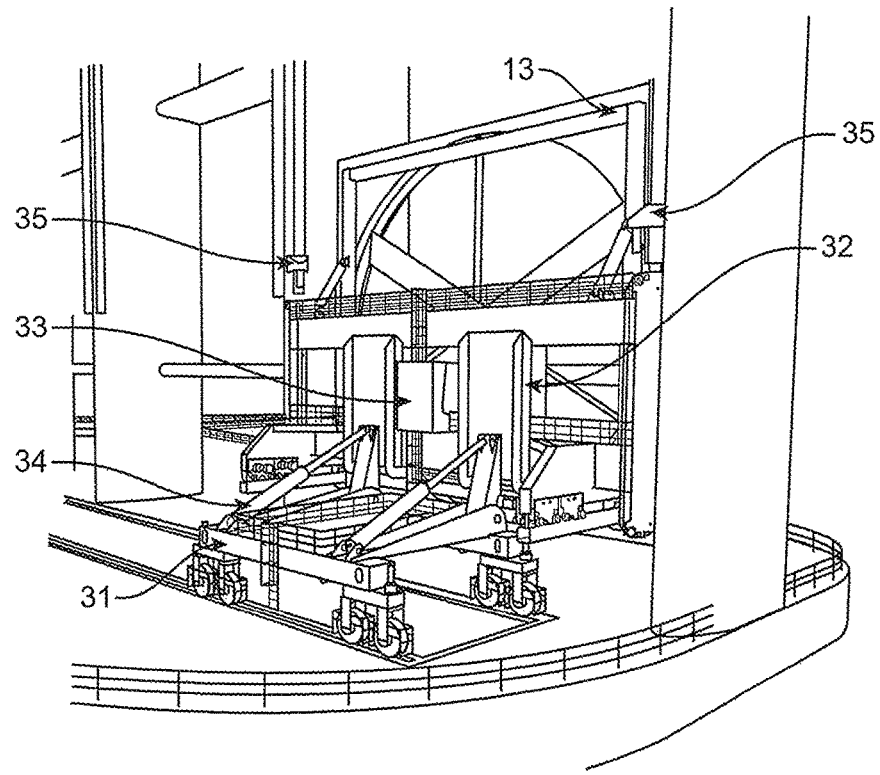
FIG. 11 shows a subsequent step to that of FIG. 10, in which the tilting assembly has raised the wind turbine generator to an upright orientation, and generator transportation means has been connected to the generator conveyor vehicle.

Referring to FIG. 9, a generator conveyance system may include a carriage 31 (running on the rail tracks 30) carries a generator conveyor vehicle 32, which in turn carries a wind turbine generator 13. The wind turbine generator 13 has been retrieved from the storage area 36. In FIG. 9, the carriage 31 is in position at the base of the sail, and a generator installation process is ready to commence. In FIG. 10, a tilting assembly 34 on the generator conveyor vehicle 32 is in the process of raising the wind turbine, generator 13 from a horizontal orientation. In FIG. 11, the tilting assembly 34 has raised the wind turbine generator 13 to an upright orientation, and generator transportation means 35 on the sail has been connected to the generator conveyor vehicle. These generator transportation means 35, which are also herein interchangeably referred to as generator transportation mechanisms, may be a rack-and-pinion system, a wire and winch system, or any other known hoisting system. FIG. 11 also shows that the generator conveyor vehicle 32 comprises an operator's cabin 33, from which the assembly and disassembly of generators may be controlled.

Figure 12:
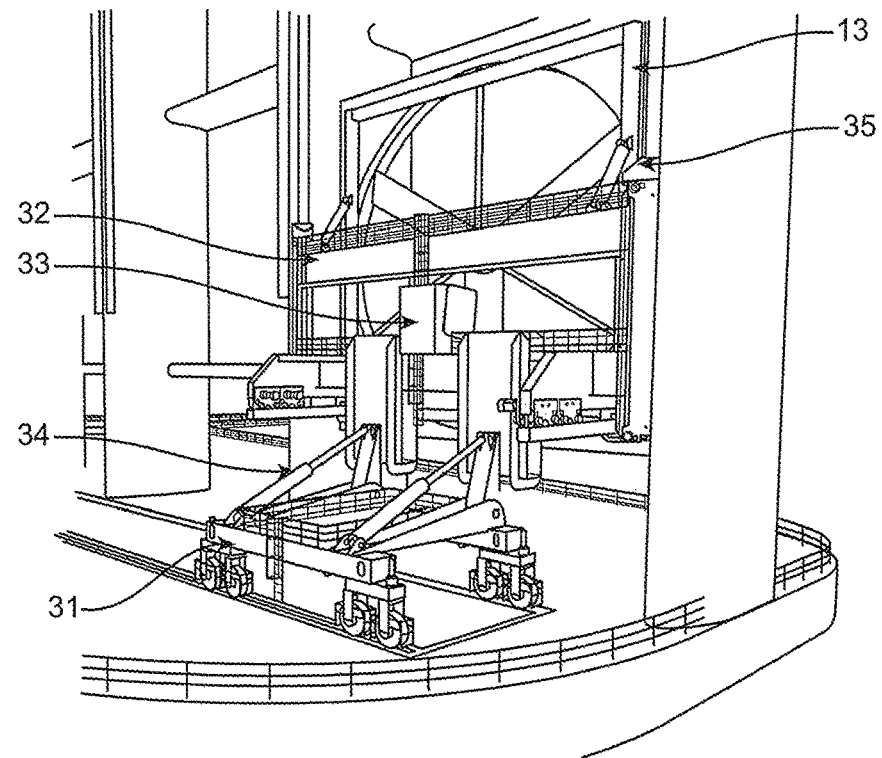
FIG. 12 shows a subsequent step to that of FIG. 11, in which the generator transportation means is hoisting the generator conveyor vehicle (holding the wind turbine generator)
Figure 13:
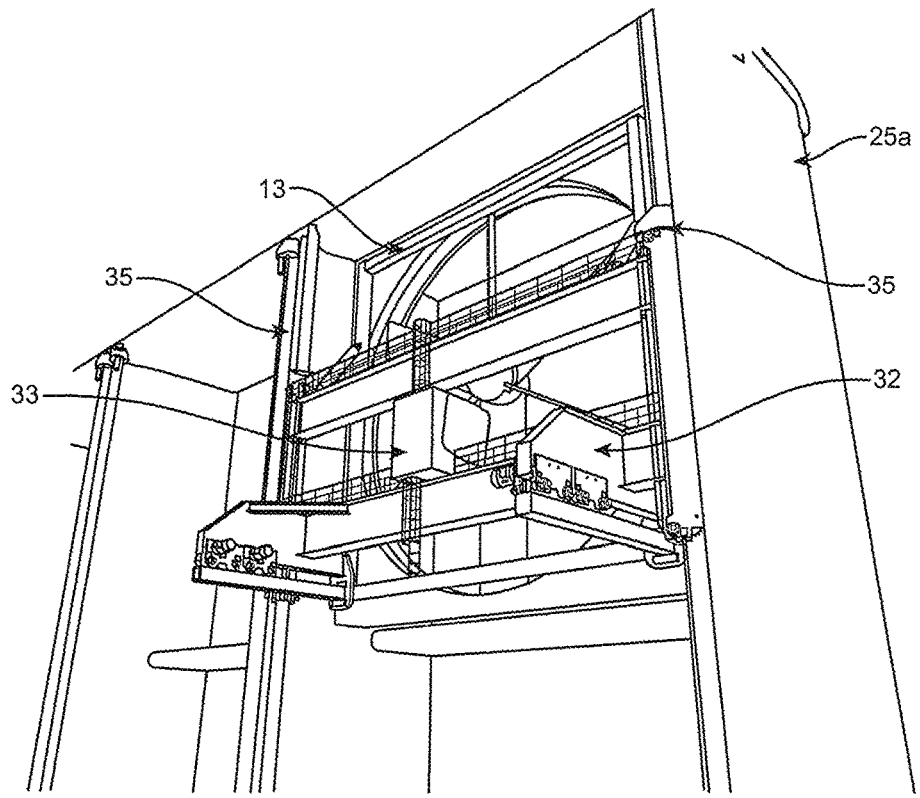
FIG. 13 shows a subsequent step to that of FIG. 12, in which the generator transportation means has hoisted the generator conveyor vehicle (holding the wind turbine generator) to the designated generator station.
Figure 14:
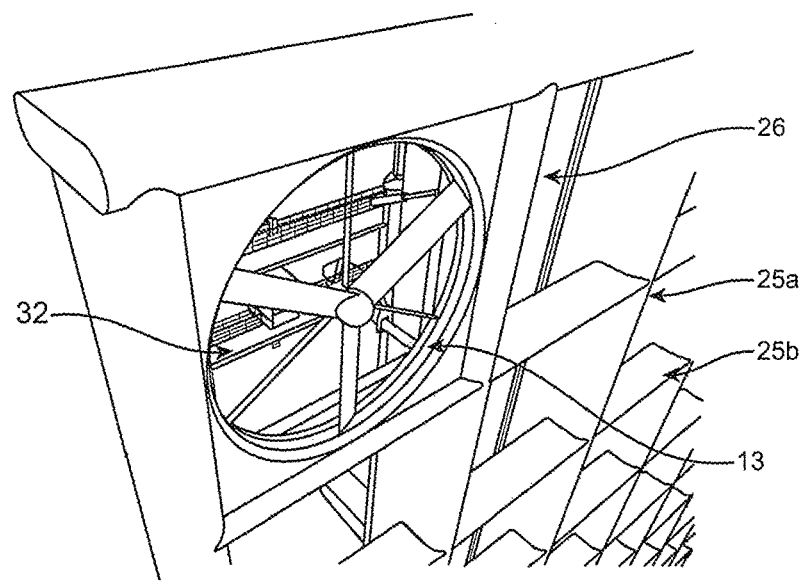
FIG. 14 shows a subsequent step to that of FIG. 13, in which the wind turbine generator has been inserted into the generator station and thus offloaded from the generator conveyor vehicle (which has started descending)
Figure 15:
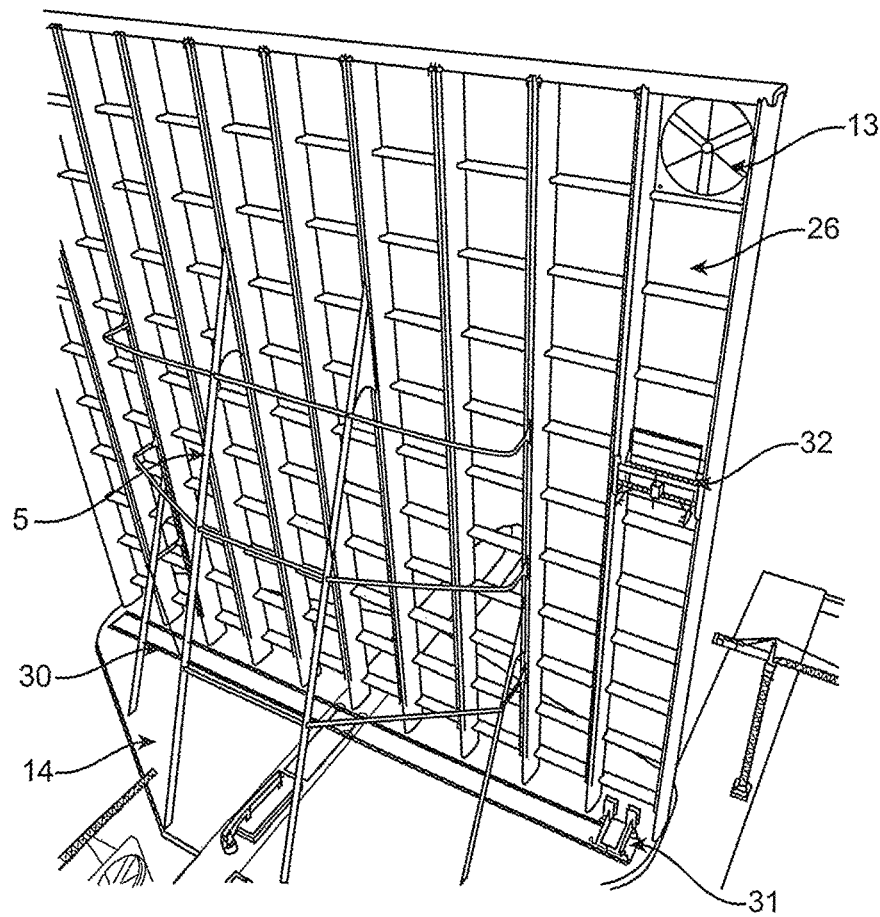
FIG. 15 is a perspective view of the second embodiment of the wind power plant, showing a wind turbine generator installed in a generator station, the generator conveyor vehicle travelling between the top of the sail and the deck, and the carriage sitting on the rails on the deck.

In FIG. 12, the generator transportation means 35 has commenced hoisting the generator conveyor vehicle 32 (holding the wind turbine generator 13), and in FIG. 13, the generator conveyor vehicle has reached its designated generator station. When in this position, actuators (not shown) advance the wind turbine generator into the generator station, in which the generator is received, supported and connected, see also FIG. 14 (required connectors, cables, etc., are not illustrated). The wind turbine generator is thus disconnected from the generator conveyor vehicle 32, which may descend to deck level. This is illustrated in FIG. 15; the wind turbine generator is installed in a generator station, the generator conveyor vehicle travelling towards the carriage sitting on the rails on the deck.

Figure 16:
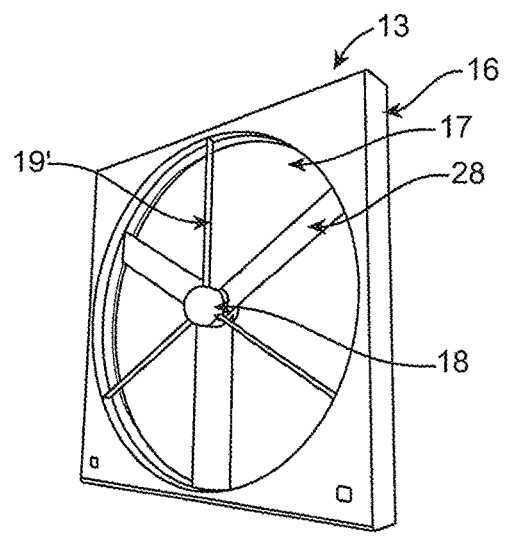
FIG. 16 is a perspective view of a second embodiment of a wind turbine generator.
Figure 17:
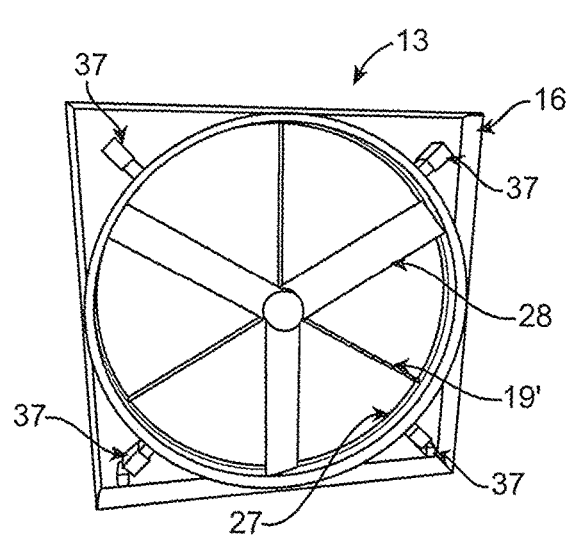
FIG. 17 is another perspective view of the wind turbine generator shown in FIG. 16, with a cover removed, illustrating a plurality of coils arranged in the housing.
Figure 18:
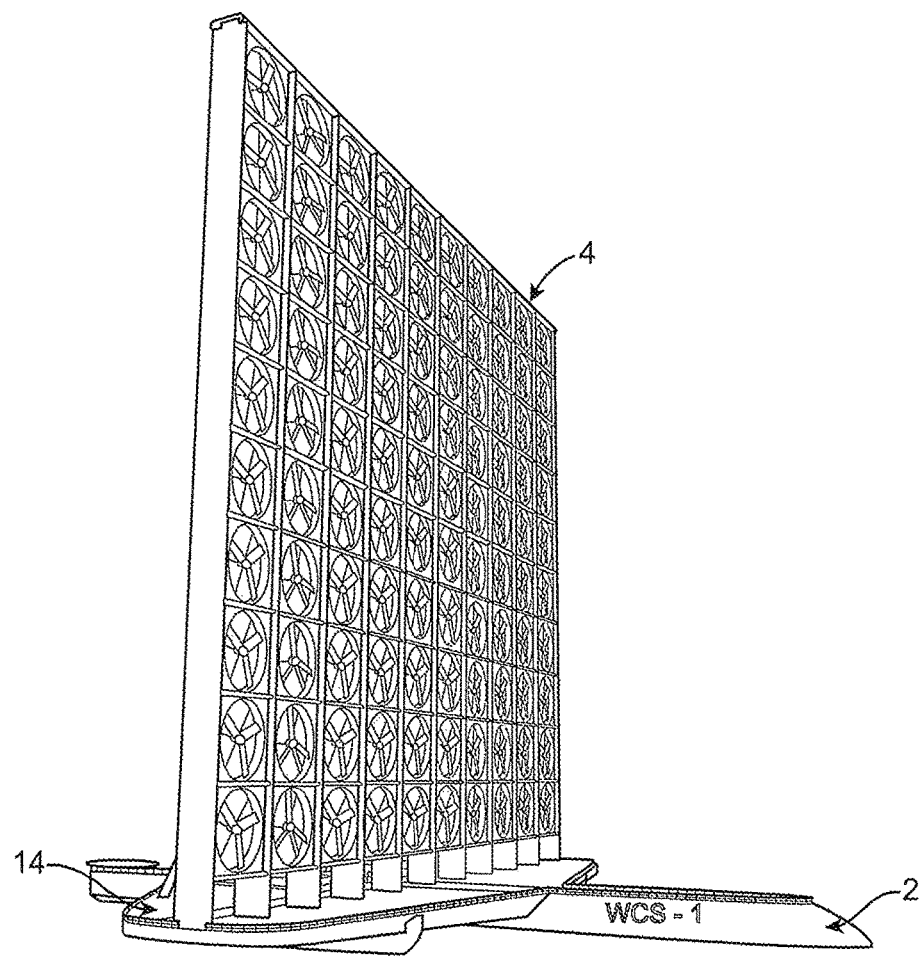
FIG. 18 is a perspective view of the second embodiment of the wind power plant, in an operational configuration.
Figure 19:
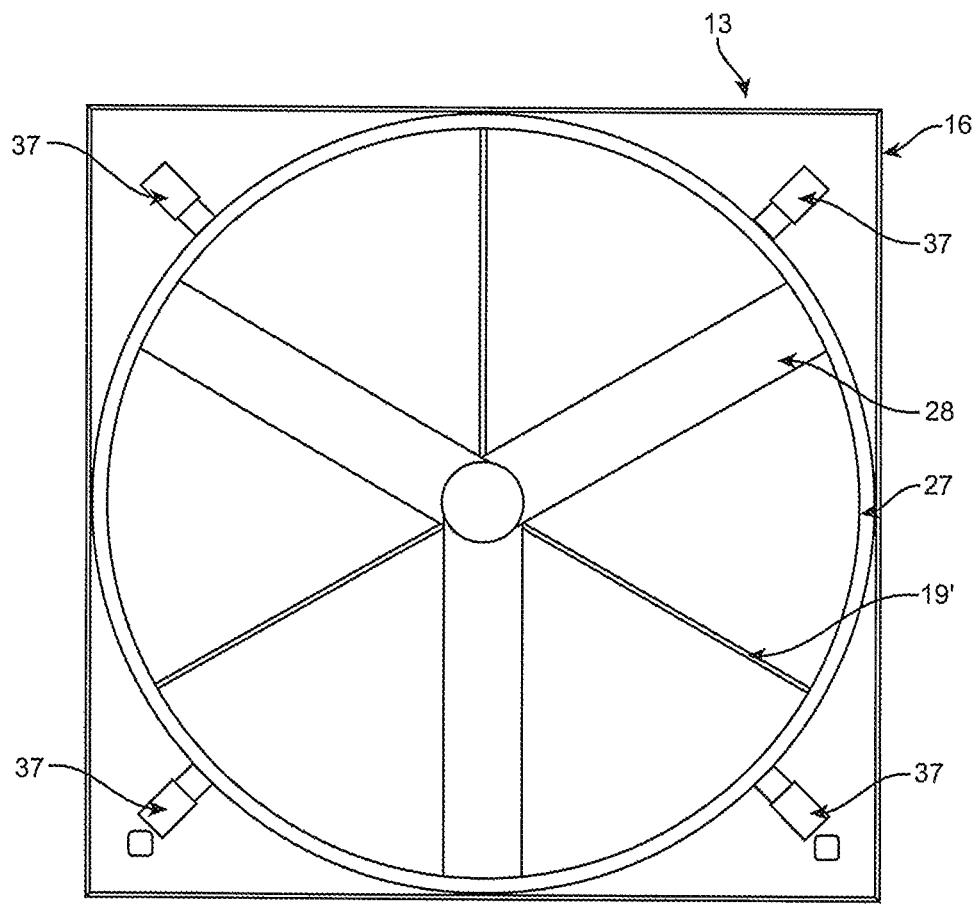
FIG. 19 is a plan view of the wind turbine generator shown in FIG. 17.

FIGS. 16, 17 and 19 illustrate a second embodiment of a wind turbine generator 13. The housing 16 (which in a preferential embodiment is made of aluminium) has an outer shape which is compatible with the shape of the generator station 26. In the illustrated embodiment, these shapes are squared, but the invention shall not be limited to such shapes. A turbine 17 is rotatably mounted, via a boss 18, to a support structure 19', which in turn is rigidly supported by the housing 16. The turbine 17 comprises a plurality of turbine blades 28 (three shown in FIGS. 16 and 17) interconnected by a peripheral rim 27. A number of magnets (not shown) are connected to or embedded in the rim 27. These magnets may be electromagnets, whereby the magnetic force may be adjusted, or permanent magnets, as described above with reference to FIGS. 4 and 5. A number of electric coils 37 are arranged in the housing 16 (in FIG. 17, four coils, one in each corner of the housing), facing, and close to, the turbine rim 27. The configuration, possible variants and operation is as described above with reference to FIGS. 4 and 5. The generator housing, rim and blades are made of a non-magnetic material. In one embodiment, this material is aluminium, for example in the form of extruded aluminium profiles.

It should be understood that power cables, control cables, transformers, and other devices necessary for operating the power plant, including the generator carrier and conveyance systems, are not shown, as these components are well known in the art.

Although the invented power plant has been described with respect to a floating platform, the invention shall not be limited to installation on a floating platform.

The invention claimed is:

1. A wind power plant, comprising:
   a platform having a deck and configured to support a frame, wherein the frame comprises a plurality of compartments arranged adjacent one another along a width direction of the frame and along a height direction of the frame, wherein each compartment of the plurality of compartments is configured to receive and support a respective removable wind turbine generator;
   a generator conveyance system configured and arranged to move a wind turbine generator between the deck and one of the plurality of compartments;
   the generator conveyance system comprising;
   a generator conveyer vehicle which is releasably connectable to a generator transportation mechanism on the frame, the generator conveyer vehicle configured to transport the wind turbine generator in a horizontal orientation along the width direction of the frame; and
   a tilting assembly configured to raise the wind turbine generator from the horizontal orientation to an upright orientation to position the wind turbine generator at one of the plurality of compartments along a height direction of the frame.

2. The wind power plant of claim 1, further comprising a carriage arranged for movement on the deck and for supporting the generator conveyer vehicle.

3. The wind power plant of claim 1, wherein the generator conveyer vehicle comprises an operator's cabin.

4. The wind power plant of claim 1, wherein the platform is a floating platform, supported by at least a main hull, connectable to a seabed via a turret mooring, whereby the wind power plant is allowed to weathervane.

5. The wind power plant of claim 4, further comprising at least one outrigger arranged on each side of the main hull whereby the main hull and the outriggers form a trimaran configuration.

6. The wind power plant of claim 1, further comprising a swivel connection connected to the platform wherein the swivel connection is connectable to a seabed via mooring lines, whereby the wind power plant is allowed to weathervane.

7. The wind power plant of claim 1, further comprising a storage area for wind turbine generators.

8. The wind power plant of claim 7, further comprising:
   rail tracks extending between the storage area and the frame, and
   a carriage configured for travelling on the rail tracks.

9. The wind power plant of claim 1, wherein the wind turbine generator comprises a housing having an outer shape which is to fit within each of the plurality of compartments.

* * * * *